(12) United States Patent
Yoneda

(10) Patent No.: US 7,019,482 B2
(45) Date of Patent: Mar. 28, 2006

(54) MOTION CONTROLLER HAVING SLIDING MODE CONTROLLER

(75) Inventor: Koji Yoneda, Sunnyvale, CA (US)

(73) Assignees: Sodick Co., Ltd., Yokohama (JP); Sodick America Corporation, San Jose, CA (US)

( * ) Notice: Subject to any disclaimer, the term of this patent is extended or adjusted under 35 U.S.C. 154(b) by 0 days.

(21) Appl. No.: 10/446,874

(22) Filed: May 29, 2003

(65) Prior Publication Data

US 2004/0239282 A1  Dec. 2, 2004

(51) Int. Cl.
*G05B 13/00* (2006.01)

(52) U.S. Cl. .............. 318/623; 318/560; 318/561; 700/28; 700/29; 700/30; 700/31

(58) Field of Classification Search ............... 318/560, 318/561, 623; 700/8–31
See application file for complete search history.

(56) References Cited

U.S. PATENT DOCUMENTS

| | | | | |
|---|---|---|---|---|
| 5,341,078 A | * | 8/1994 | Torii et al. | 318/568.22 |
| 5,369,345 A | * | 11/1994 | Phan et al. | 318/561 |
| 5,384,525 A | * | 1/1995 | Kato | 318/610 |
| 5,442,270 A | * | 8/1995 | Tetsuaki | 318/568.22 |
| 5,469,414 A | * | 11/1995 | Okamura | 360/78.06 |
| 5,475,291 A | * | 12/1995 | Yoshida et al. | 318/568.22 |
| 5,510,939 A | * | 4/1996 | Lewis | 360/78.09 |
| 5,585,976 A | * | 12/1996 | Pham | 360/77.04 |
| 5,631,999 A | * | 5/1997 | Dinsmore | 388/805 |
| 5,847,895 A | * | 12/1998 | Romano et al. | 360/78.09 |
| 5,880,952 A | * | 3/1999 | Yasui et al. | 700/28 |
| 5,952,804 A | * | 9/1999 | Hamamura et al. | 318/560 |
| 6,046,878 A | * | 4/2000 | Liu et al. | 360/75 |

FOREIGN PATENT DOCUMENTS

| | | |
|---|---|---|
| JP | A 2-297603 | 12/1990 |
| JP | A 3-25505 | 2/1991 |
| JP | B2 2999330 | 12/1993 |

\* cited by examiner

*Primary Examiner*—Rita Leykin
(74) *Attorney, Agent, or Firm*—McDermott Will & Emery LLP

(57) ABSTRACT

A motion controller for maintaining a controlled system on a switching hyperplane regardless of the magnitude of disturbance. The motion controller includes a target position generator, a sliding mode controller, a disturbance observer and a state observer. The target observer generates a target position to the sliding mode controller based on position and velocity data. The state observer estimates the state of the controlled system and provides the state to the sliding mode controller. And, the disturbance observer provides an estimated disturbance to the sliding mode control. The sliding mode controller generates a control input to the controlled system with the nonlinear component set to equal the negative estimated disturbance and the linear component based on the estimated state and target position.

19 Claims, 6 Drawing Sheets

MOTION CONTROLLER HAVING SLIDING MODE CONTROLLER

FIELD OF THE INVENTION

The present invention relates to a motion controller for controlling a servomotor which moves a movable member. In particular, the invention relates to a motion controller-having a sliding mode controller.

BACKGROUND OF THE INVENTION

A machine tool removes workpiece material by cutting, grinding, lathe turning, polishing, or electric discharge machining. The modern machine tool is provided with a computerized numerical controller ("CNC") and a motion controller. The CNC interprets a numeric control program ("NC program") and generates position data, velocity data and data indicative of the other state values. The CNC is equipped with an operation panel and a display device as a human interface, and has various functions which enable an operator to run a machine tool. The motion controller controls a servomotor so as to drive a movable member in a desired direction at a desired velocity and stop it at a desired position. The motion controller receives position data and velocity data from the CNC and calculates acceleration, compensation such as pitch error compensation, feedforward control, feedback control and determines a tool path which it supplies as a control signal to the servomotor.

Attempts to apply a sliding mode control to the servo system for machine tools have been made, and improved positioning accuracy is expected. Recently, a linear motor driven machine tool has become common. As it has no transmission for transmitting a drive force of a rotary servomotor to a movable member, backlash is eliminated. Therefore, the sliding mode control method particularly suits the linear motor driven machine tool and good performance results which offset the increased design cost are expected.

The sliding mode control is applicable to a discontinuously changing nonlinear system, a variable parameter system and a system having uncertain disturbances. In general, a sliding mode controller is constructed as a variable structure, proportional-integral controller. The sliding mode controller ensures robustness against modeling errors and uncertain disturbances by the switching of the control input which is provided to the controlled system. In the sliding mode controller, the control input is usually divided into a linear control input and a nonlinear control input. The linear control input keeps the state of the controlled system on a switching hyperplane while the nonlinear control input forces the state of the controlled system to remain on the switching hyperplane in the presence of modeling errors and uncertain disturbances. The designer of the sliding mode controller must set the switching gain a priori according to the expected maximum of the uncertain disturbance so that the disturbance can be canceled by the nonlinear control input. If the switching gain is set to an unduly small value, the state of the controlled system may not be maintained on a switching hyperplane. Additionally, an excessively large switching gain is likely to result in undesirable "chattering" behavior.

Therefore, there is a need to provide a motion controller with a sliding mode controller in which the state of the controlled system can be maintained on the switching hyperplane regardless of the magnitude of the disturbance.

SUMMARY OF THE INVENTION

The present invention relates to a motion controller with a sliding mode controller for maintaining a controlled system on the switching hyperplane.

According to one aspect of the present invention, the motion controller includes a sliding mode controller for providing a control input to the servomotor with the control input having two components, a linear control input and a nonlinear control input; a state observer for estimating the state of the controlled system and for providing an estimated state $\hat{z}$ of the controlled system to the sliding mode controller; and a disturbance observer for providing an estimated disturbance to the sliding mode controller, wherein the nonlinear control input is based on the estimated disturbance. In a preferred embodiment, the nonlinear control input equals the negative of the estimated disturbance.

Other and further objects and advantages of the present invention will be further understood and appreciated by those skilled in the art by reference to the following specification, claims and drawings.

DETAILED DESCRIPTION OF THE PREFERRED EMBODIMENT

Figure 1:
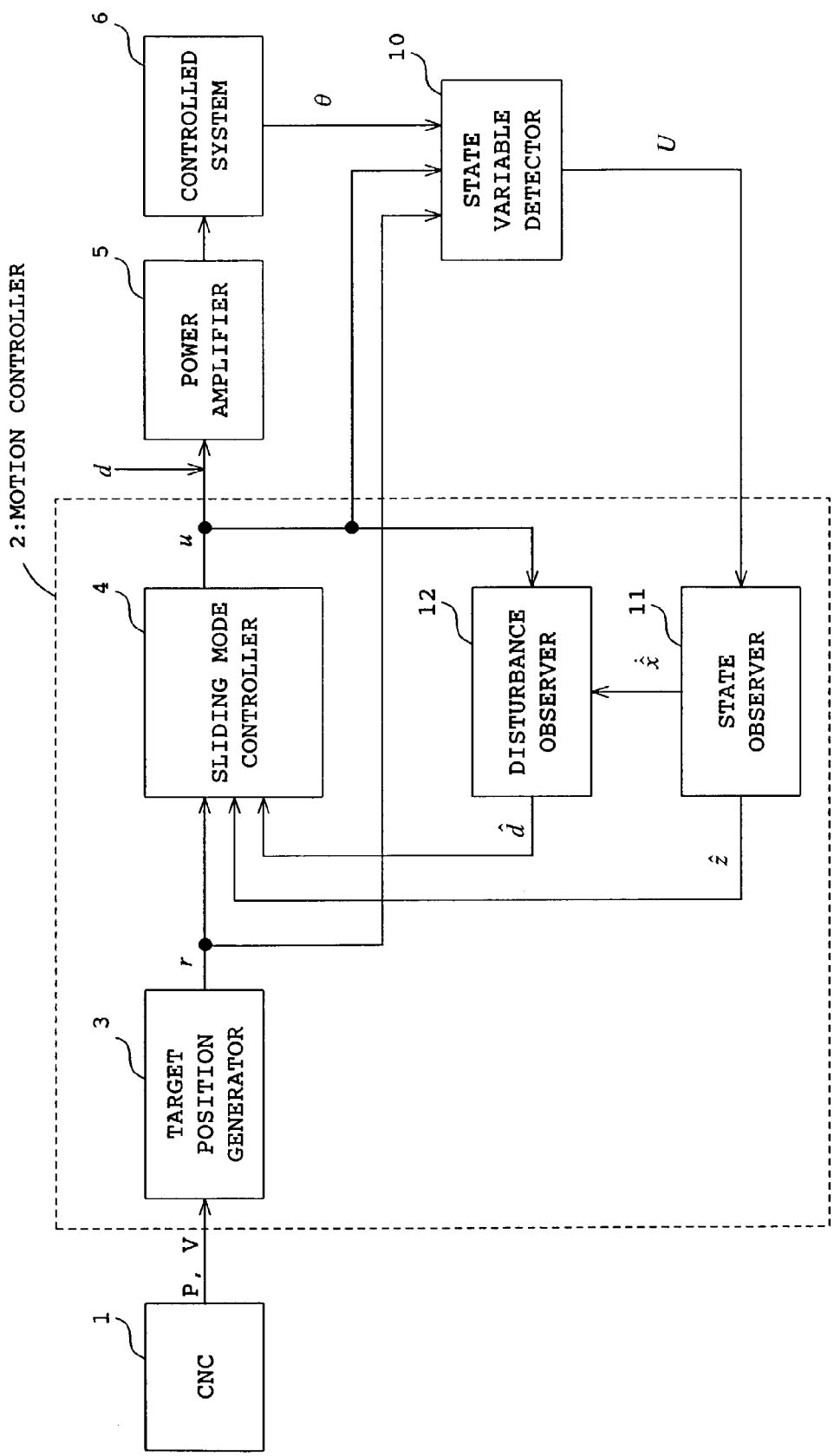
FIG. 1 is a block diagram of a controlled system with a motion controller in accordance with the present invention.

FIG. 1 depicts an implementation of the present invention including a CNC 1, a motion controller 2, a power amplifier 5, a controlled system 6 and a state variable detector 10.

A CNC 1 interprets a NC program and calculates desired position data P and velocity data V to a motion controller 2. The CNC 1 also provides data indicative of other state values such as a pitch error. The motion controller 2 determines a target position r based on desired position data P and velocity data V and revises the target position r so as to provide a control input u to a controlled system 6 through a power amplifier 5. In one embodiment, the control input u is a controlled current for a servomotor. The motion controller 2 comprises a target position generator 3, a sliding mode controller 4, a state observer 11 and a disturbance observer 12. In one embodiment, the controlled system 6 includes a movable member such as a work table, which is linearly reciprocable along one axis in a machine tool, and a rotary servomotor for driving the movable member. In a preferred embodiment, a position detector (not shown), such as a rotary encoder and a linear scale, is used for measuring the position of the servomotor. A state variable detector 10 receives the target position r and the control input u from the motion controller 2 and the measured position θ from the sensor. The state variable detector 10 provides the state variable U as an input to the motion controller 2.

Figure 2:
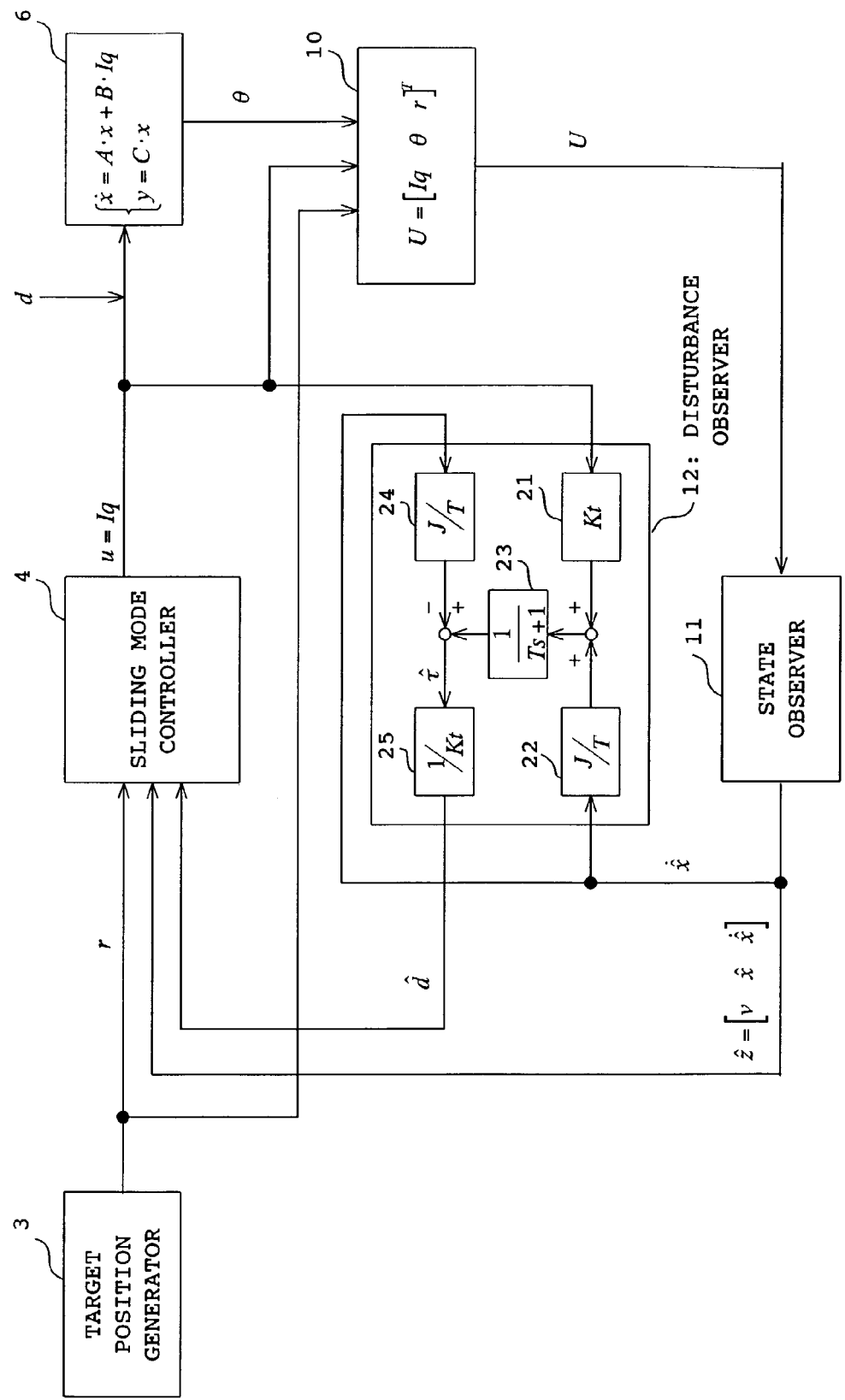
FIG. 2 depicts the implementation of the motion controller of FIG. 1.

FIG. 2 depicts the implementation of the motion controller 2. The controlled system 6 can be represented by the following equation of motion:

$$J\ddot{\theta} = Kt \cdot Iq - d \quad (1)$$

where J is an inertia moment, θ is an angular position, Kt is a torque constant, Iq is a q-axis current and d is the disturbance. Based on equation (1), the state equation of the controlled system 6 is represented as follows:

$$\begin{cases} \dot{x} = A \cdot x + B \cdot u \\ y = C \cdot x \end{cases} \quad (2)$$

$$A = \begin{bmatrix} 1 & 0 \\ 0 & 0 \end{bmatrix}, B = \begin{bmatrix} 0 \\ Kt/J \end{bmatrix}, C = [1 \ 0], x = \begin{bmatrix} \theta \\ \dot{\theta} \end{bmatrix}, u = Iq$$

The control input u, i.e., the q-axis current Iq is provided from the sliding mode controller 4. The sliding mode controller 4 constrains the state of the controlled system 6 on the switching hyperplane S by the switching of the control input u. Based on the state equation (2), a switching function σ in the sliding mode controller 4 is defined as follows:

$$\begin{cases} \dot{z} = As \cdot z + Bs \cdot u + Es \cdot r + Fs \cdot d \\ \sigma = S \cdot z \end{cases} \quad (3)$$

$$As = \begin{bmatrix} 0 & -C \\ 0 & A \end{bmatrix}, Bs = \begin{bmatrix} 0 \\ B \end{bmatrix}, Es = \begin{bmatrix} 1 \\ 0 \end{bmatrix}, Fs = \begin{bmatrix} 0 \\ F \end{bmatrix}, z = \begin{bmatrix} v \\ x \end{bmatrix},$$

$$S = [S_1 \ S_2 \ S_3]$$

$$\dot{v} = e = r - y$$

where z is the state of the controlled system, y is the measured position θ, S is a hyperplane matrix, e is an error between the target position r and the measured position θ and v is an integral value of the error e.

The design of the sliding mode controller 4 is governed by the following control law (4):

$$u = u_l + u_{nl} \quad (4)$$

where $u_l$ is a linear control input and $u_{nl}$ is a nonlinear control input accommodating a modeling error and an uncertain disturbance. The linear control input $u_l$ keeps the state of the controlled system on the hyperplane S while the nonlinear control input $u_{nl}$ forces the state of the controlled system to remain on the switching hyperplane S. The linear and nonlinear control inputs $u_l$ and $u_{nl}$ for the conventional sliding mode controller can be represented by the equations (5) and (6), resulting in the control input u given in equation (7):

$$u_l = -(S \cdot Bs)^{-1}(S \cdot As \cdot z + S \cdot Es \cdot r) \quad (5)$$

$$u_{nl} = -(S \cdot Bs)^{-1}\left(k \cdot \frac{\sigma}{|\sigma| + \eta}\right) \quad (6)$$

$$u = -(S \cdot Bs)^{-1}(S \cdot As \cdot z + S \cdot Es \cdot r) - k(S \cdot Bs)^{-1} \cdot \frac{\sigma}{|\sigma| + \eta} \quad (7)$$

Additionally, the Lyapunov function V is chosen as follows:

$$V = \frac{1}{2}\sigma^2 \quad (8)$$

The reaching condition is given as follows:

$$\dot{V} < 0 \quad (9)$$

To satisfy the reaching condition, when z does not equal to zero, the time derivative of the Lyapunov function V (which is shown in equation (10) with the assumption that η equals to zero) must be negative definite:

$$\dot{V} = \sigma \cdot S(As \cdot z + Bs \cdot u + Es \cdot r + Fs \cdot d)$$

$$\dot{V} = \sigma(S \cdot As \cdot z + S \cdot Bs \cdot u + S \cdot Es \cdot r + S \cdot Fs \cdot d)$$

$$\dot{V} = \sigma(S \cdot As \cdot z + S \cdot Bs\{-(S \cdot Bs)^{-1}(S \cdot As \cdot z + S \cdot Es \cdot r) - k(S \cdot Bs)^{-1}\frac{\sigma}{|\sigma|}\} + S \cdot Es \cdot r + S \cdot Fs \cdot d) \quad (10)$$

$$\dot{V} = \sigma\left(S \cdot As \cdot z - S \cdot As \cdot z - S \cdot Es \cdot r - k\frac{\sigma}{|\sigma|} + S \cdot Es \cdot r + S \cdot Fs \cdot d\right)$$

$$\dot{V} = -k|\sigma| + \sigma \cdot S \cdot Fs \cdot d$$

The switching gain k is set to satisfy the following condition (11):

$$k > |S \cdot Fs \cdot d_{max}| \quad (11)$$

where $d_{max}$ is the maximum of the disturbance.

If the switching gain k is appropriately set, the reaching condition in equation (9) is satisfied, and the state of the controlled system 6 is constrained on the switching hyperplane S.

Conventional sliding mode controllers set the switching gain k based on knowledge of the maximum disturbance $d_{max}$. If the switching gain k is set too small, the state of the controlled system 6 may not be constrained on the switching hyperplane. If the switching gain k is set too large, unwanted "chattering" behavior may result. Thus, it is difficult to predict the maximum value $d_{max}$ of the uncertain disturbance.

Thus, in a preferred embodiment of the present invention, the nonlinear control input $u_{nl}$ is represented by the negative estimated disturbance $-\hat{d}$. Accordingly, the control input u is given as follows:

$$u = -(S \cdot Bs)^{-1}(S \cdot As \cdot z + S \cdot Es \cdot r) - \hat{d} \quad (12)$$

Further, assuming that the estimated disturbance $\hat{d}$ is almost equal to the actual disturbance d, equation (10) then becomes equation (13) below:

$$\dot{V} = \sigma(S \cdot As \cdot z + S \cdot Bs\{-(S \cdot Bs)^{-1}(S \cdot As \cdot z + S \cdot Es \cdot r) - \hat{d}\} + S \cdot Es \cdot r + S \cdot Fs \cdot d)$$

$$\dot{V} = \sigma(S \cdot As \cdot z - S \cdot As \cdot z - S \cdot Es \cdot r - S \cdot Bs \cdot \hat{d} + S \cdot Es \cdot r + S \cdot Fs \cdot d)$$

$$\dot{V} = \sigma(-S \cdot Bs \cdot \hat{d} + S \cdot Fs \cdot d)$$

$$\dot{V} = \sigma(-S \cdot Bs + S \cdot Fs)d < 0 \tag{13}$$

Accordingly, from equation (13), with the time derivative of the Lyapunov function being less than zero, the reaching condition will be satisfied and the state of the controlled system will be maintained on the hyperplane S regardless of the magnitude of the disturbance d.

The sliding mode controller 4 receives the target position r from the target position generator 3. The target position generator 3 generates the target position r based on position data P and velocity data V from the CNC 1 and compensates for pitch error. The state z is observed by a state observer 11. The state observer 11 provides an estimated state $\hat{z}$ to the sliding mode controller 4. The estimated state $\hat{z}$ is defined by equation (14) as follows:

$$\hat{z} = [v \ \hat{x} \ \dot{\hat{x}}] \tag{14}$$

where and v is the count of accumulated pulses, $\hat{x}$ is an estimated position and $\dot{\hat{x}}$ is an estimated velocity. The estimated state $\hat{z}$ includes modeling errors. In one embodiment, the state observer 11 estimates the state z based on a state variable U which is represented by equation (15) as follows:

$$U = [Iq \ \theta \ r]^T \tag{15}$$

where T represents a transposition. The state variable U is provided to the state observer 11 from the state variable detector 10 which receives the q-axis current Iq, the measured position θ and the target position r.

In a preferred embodiment, the sliding mode controller 4 uses the estimated disturbance $\hat{d}$ to determine the nonlinear control input $u_{nl}$. There are two inputs to the disturbance observer 12: one, the estimated velocity $\dot{\hat{x}}$ (which is a component of the estimated state $\hat{z}$) from the state observer 11, and two, the q-axis current Iq. These two inputs are used for generating the estimated disturbance $\hat{d}$. The estimated disturbance $\hat{d}$ includes parameter variations and disturbance. The q-axis current Iq is multiplied by the torque constant Kt in a multiplier 21. The estimated velocity $\dot{\hat{x}}$ is multiplied by J/T in multipliers 22 and 24. The character T represents a time constant of a low-pass filter 23. The sum of outputs of the multipliers 21 and 22 is supplied to the low-pass filter 23. An estimated disturbance torque $\hat{\tau}$ is obtained by subtracting an output of the multiplier 24 from an output of the low-pass filter 23. A multiplier 25 multiplies the estimated disturbance torque $\hat{\tau}$ by 1/Kt to generate the estimated disturbance $\hat{d}$ which is a q-axis current corresponding to the estimated disturbance torque $\hat{\tau}$.

Comparisons by simulation of the motion controller 2 using equation (12) with using the equation (7) are presented below.

Figure 3A:
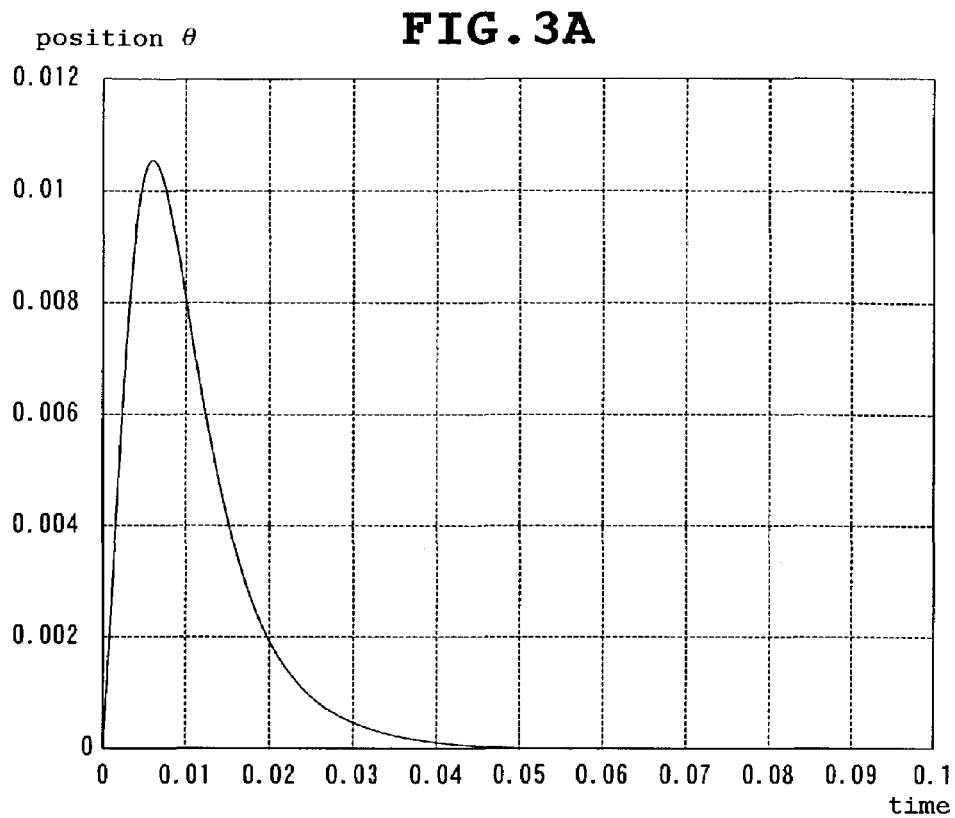
FIG. 3A is a graph of measured position θ versus time in which an expected disturbance occurs and the reaching condition is satisfied.
Figure 3B:
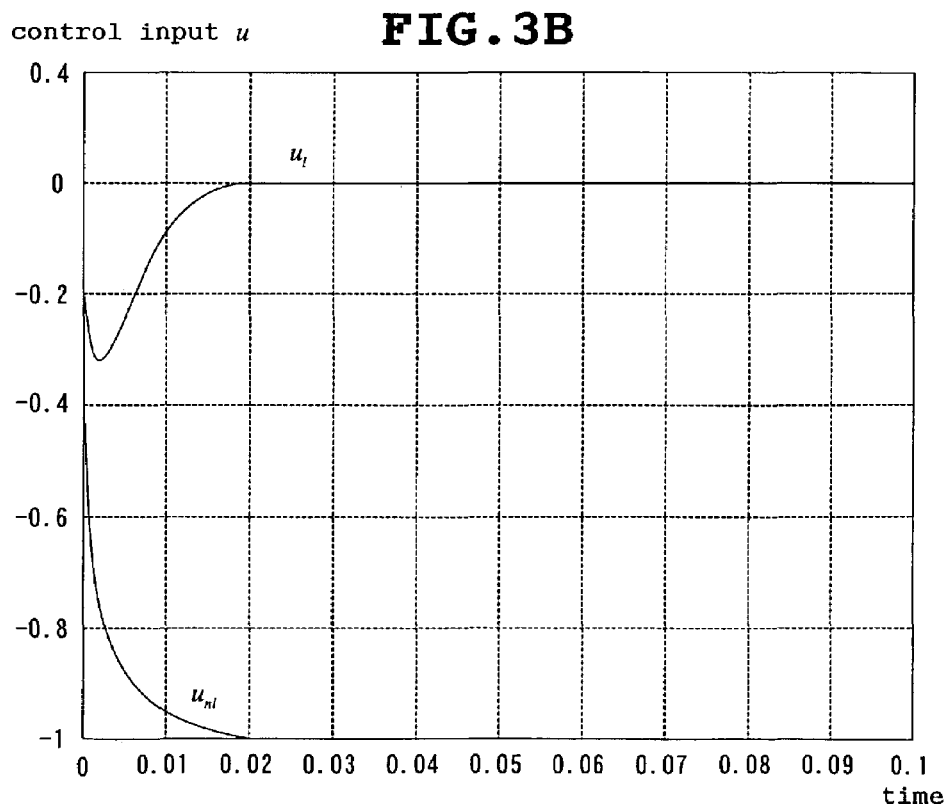
FIG. 3B is a graph of linear and nonlinear control inputs $u_l$ and $u_{nl}$ versus time in which an expected disturbance occurs and the reaching condition is satisfied.

FIGS. 3A, 3B, 4A and 4B show the simulation of the motion controller using equation (7) where S·Fs≈13500 is given and the switching gain k is set to 15000. In FIGS. 3A and 3B, the measured position θ and the control inputs $u_l$ and $u_{nl}$ are plotted when a disturbance torque corresponding to 1A is given. The reaching condition is satisfied as the switching gain k is set in equation (16) as follows:

$$15000 = k > |S \cdot Fs \cdot d| = |13500 * 1| \tag{16}$$

Figure 4A:
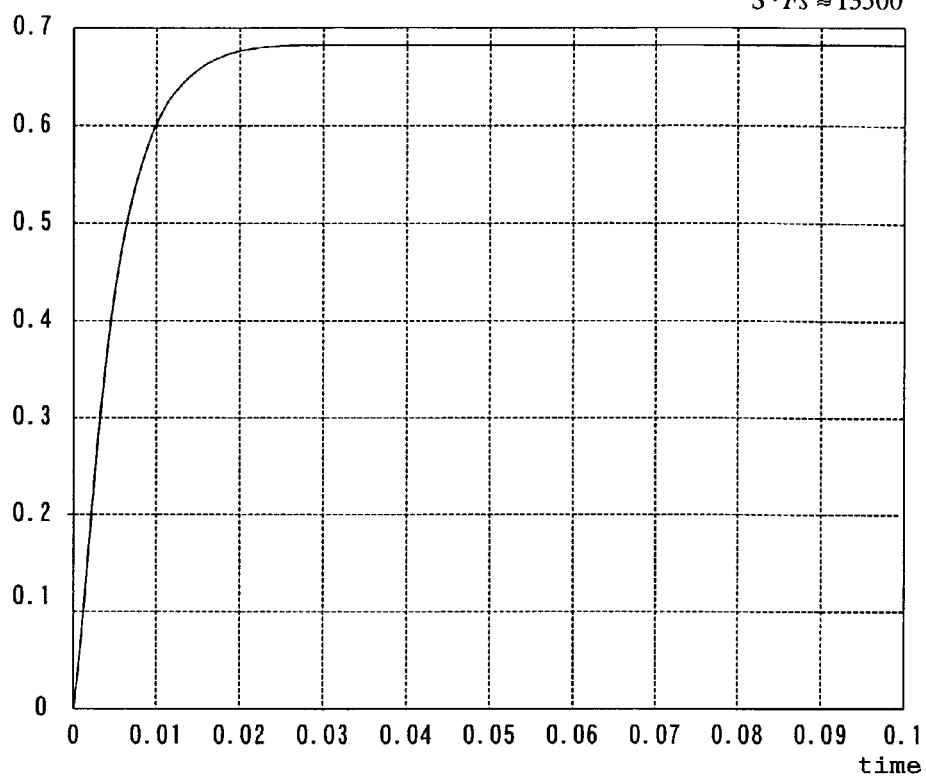
FIG. 4A is a graph of measured position θ versus time in which the reaching condition is not satisfied by an unexpected disturbance.
Figure 4B:
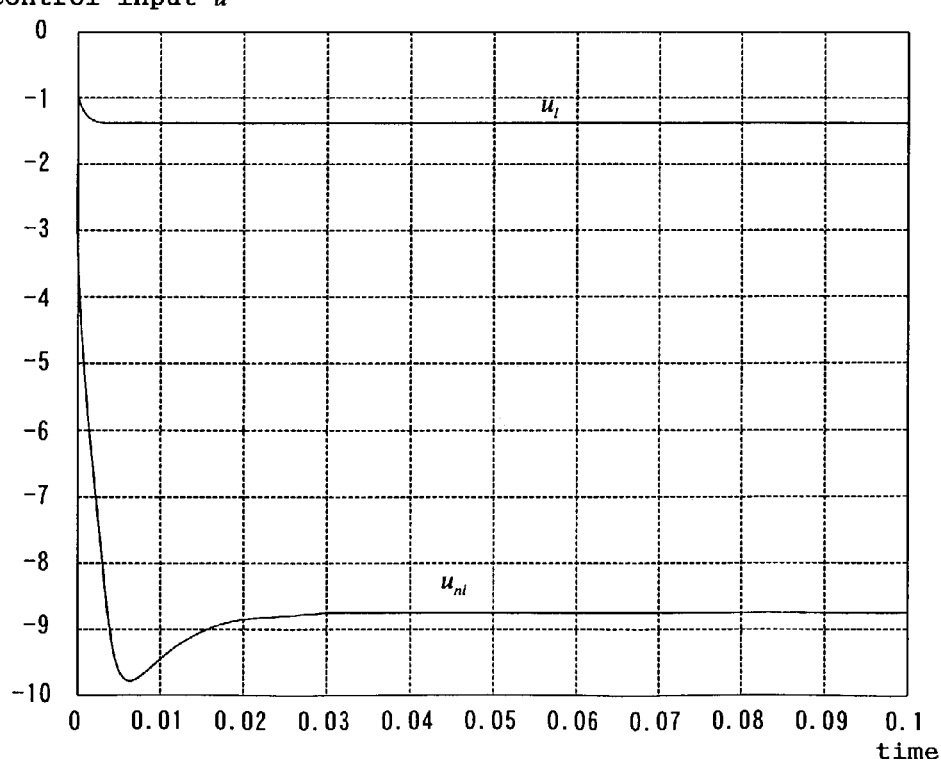
FIG. 4B is a graph of linear-and nonlinear control inputs $u_l$ and $u_{nl}$ versus time in which the reaching condition is not satisfied by an unexpected disturbance.

In FIGS. 4A and 4B, the measured position θ and the control inputs $u_l$ and $u_{nl}$ are plotted with a disturbance torque of 10A. The reaching condition is not satisfied as an unexpected disturbance occurs as illustrated in equation (17) below:

$$15000 = k < |S \cdot Fs \cdot d| = |13500 * 10| \tag{17}$$

As a result, an error between the target position r and the measured position θ remains.

Figure 5A:
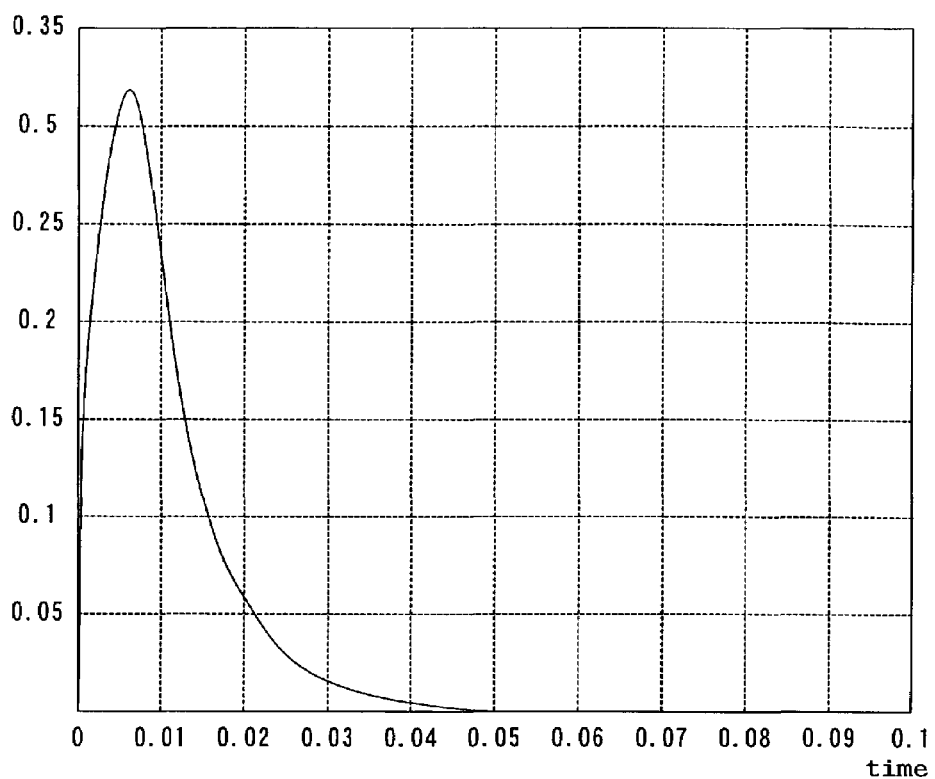
FIG. 5A is a graph of measured position θ versus time in which the reaching condition is satisfied regardless of the magnitude of the disturbance.
Figure 5B:
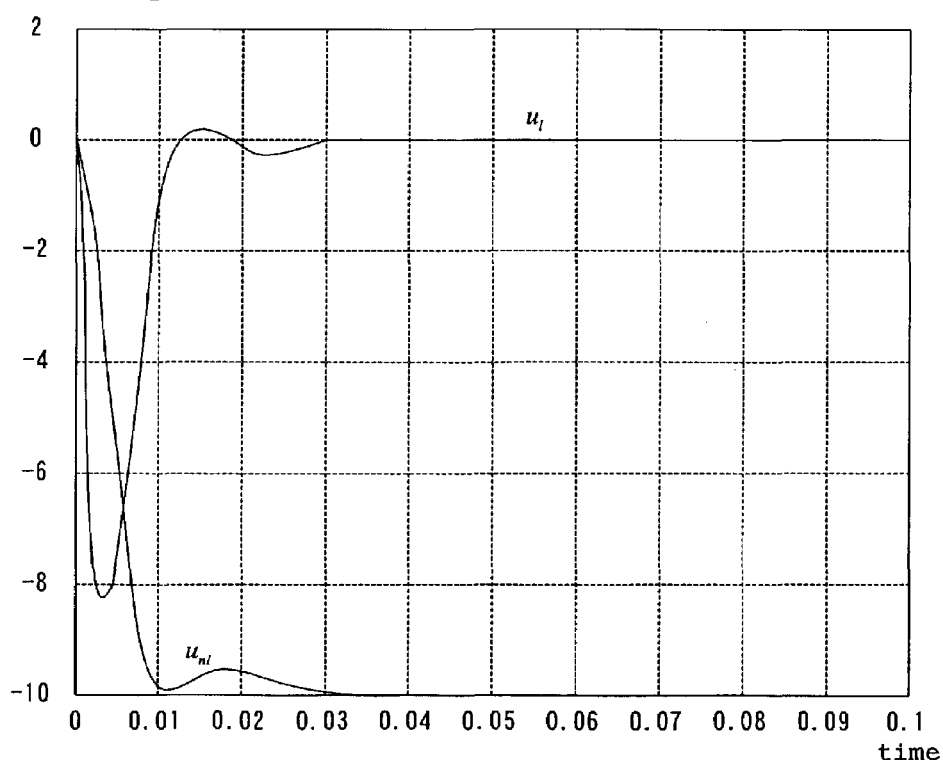
FIG. 5B is a graph of linear and nonlinear control inputs $u_l$ and $u_{nl}$ versus time in which the reaching condition is satisfied regardless of the magnitude of the disturbance.
Figure 6A:
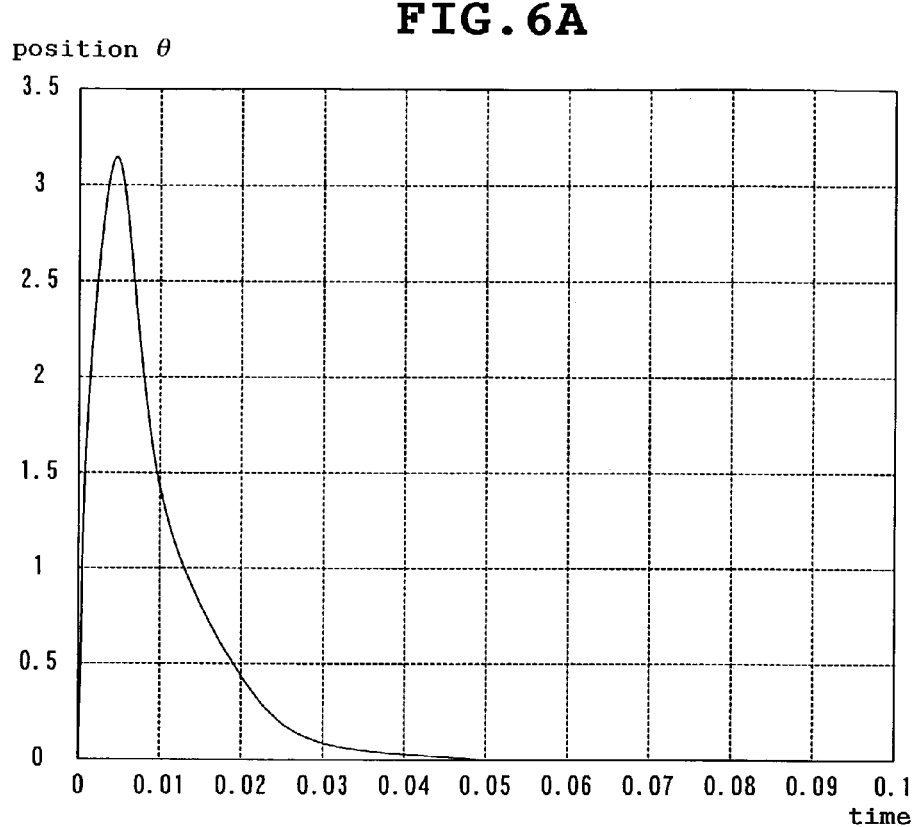
FIG. 6A is a graph of measured position θ versus time in which the reaching condition is satisfied regardless of the magnitude of the disturbance.
Figure 6B:
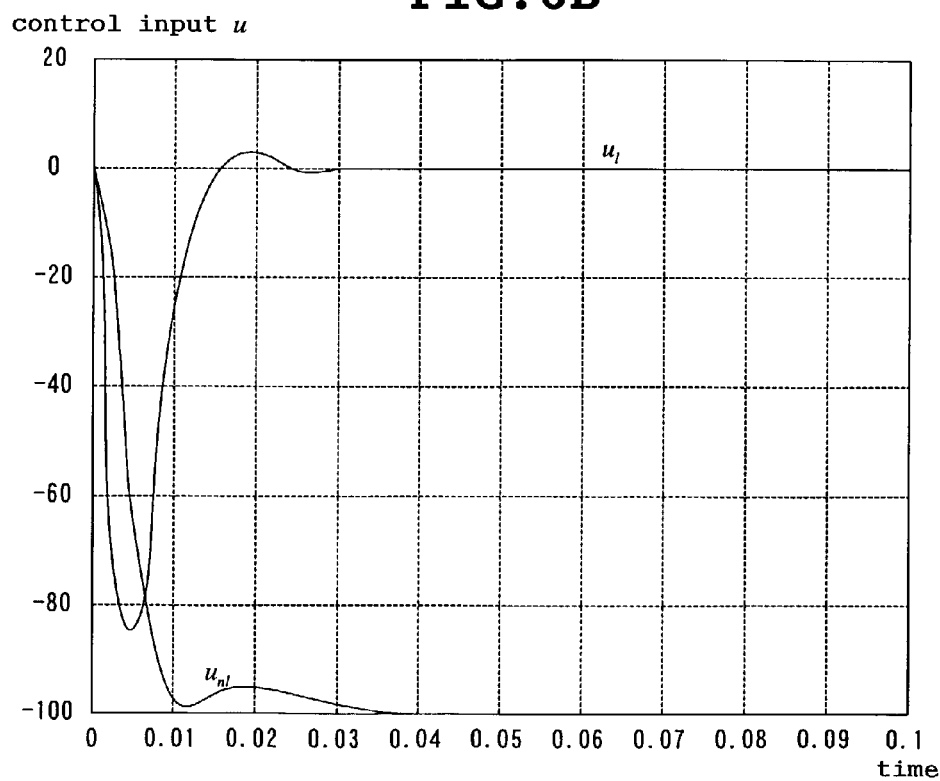
FIG. 6B is a graph of linear and nonlinear control inputs $u_l$ and $u_{nl}$ versus time in which the reaching condition is satisfied regardless of the magnitude of the disturbance.

FIGS. 5A, 5B, 6A and 6B show the simulation of the motion controller 2 using equation (12), where the nonlinear control input $u_{nl}$ is replaced by the negative estimated disturbance $-\hat{d}$. In FIGS. 5A and 5B, the measured position θ and the control inputs $u_l$ and $u_{nl}$ are plotted with a disturbance torque corresponding to 10A. In FIGS. 6A and 6B, the measured position θ and the control inputs $u_l$ and $u_{nl}$ are plotted with a disturbance torque corresponding to 100A. As shown in FIGS. 5A, 5B, 6A and 6B, the disturbance is canceled by the nonlinear control input $u_{nl}$ regardless of the magnitude of the disturbance d.

While the present invention has been described in terms of the preferred embodiments, other variations which are within the scope of the invention as defined in the claims will be apparent to those skilled in the art.

The invention claimed is:

1. A motion controller for controlling a servomotor to move a movable member to a desired position, comprising:
   a sliding mode controller for providing a control input to the servomotor wherein the control input includes a linear control input and a nonlinear control input;
   a state observer for estimating a state of a controlled system which includes the servomotor and the movable member, and for providing an estimated state of the controlled system to the sliding mode controller; and
   a disturbance observer for providing an estimated disturbance to the sliding mode controller, wherein the nonlinear control input is based on the estimated disturbance,
   wherein disturbance "d" is defined from an equation of motion for the controlled system as follows:

$$d = Kt \cdot Iq - J\ddot{\theta}$$

where Kt is a torque constant, Iq is a q-axis current, J is an inertia moment, θ is an angular position, and $\ddot{\theta}$ is the corresponding angular acceleration.

2. The motion controller of claim 1 wherein the nonlinear control input equals the negative of the estimated disturbance.

3. The motion controller of claim 1 wherein the control input is a controlled current for the servomotor.

4. The motion controller of claim 1 wherein the estimated state is based on an estimated position and an estimated velocity.

5. The motion controller of claim 4 wherein the estimated state is further based on an integral value of an error between a target position and a measured position.

6. The motion controller of claim 1 wherein the state observer generates an estimated velocity.

7. The motion controller of claim 6 wherein the disturbance observer receives the control input and the estimated velocity.

8. The motion controller of claim 1 further comprising a target position generator for providing a target position to the sliding mode controller.

9. The motion controller of claim 8 wherein a state equation of the controlled system is represented as follows:

$$\begin{cases} \dot{x} = A \cdot x + B \cdot u \\ y = C \cdot x \end{cases}$$

$$A = \begin{bmatrix} 1 & 0 \\ 0 & 0 \end{bmatrix}, B = \begin{bmatrix} 0 \\ Kt/J \end{bmatrix}, C = [1 \; 0], x = \begin{bmatrix} \theta \\ \dot{\theta} \end{bmatrix}, u = Iq$$

wherein a switching function σ is represented as follows:

$$\begin{cases} \dot{z} = As \cdot z + Bs \cdot u + Es \cdot r + Fs \cdot d \\ \sigma = S \cdot z \end{cases}$$

$$As = \begin{bmatrix} 0 & -C \\ 0 & A \end{bmatrix}, Bs = \begin{bmatrix} 0 \\ B \end{bmatrix}, Es = \begin{bmatrix} 1 \\ 0 \end{bmatrix}, Fs = \begin{bmatrix} 0 \\ F \end{bmatrix}, z = \begin{bmatrix} v \\ x \end{bmatrix},$$

$$S = [S_1 \; S_2 \; S_3]$$

$\dot{v} = e = r - y$ where z is a state of the controlled system, y is the measured position θ, S is a hyperplane matrix, e is an error between the target position r and the measured position θ, and v is an integral value of the error e; and wherein the linear control input $u_l$ is represented as follows:

$u_l = -(S \cdot Bs)^{-1}(S \cdot As \cdot z + S \cdot Es \cdot r)$.

10. The motion controller of claim 8 further comprising a position detector for generating a measured position; and
a state variable detector for receiving the target position, the control input and the measured position, and wherein the state variable detector generates a state variable as an input to the state observer.

11. The motion controller of claim 8 further comprising a computerized numerical controller and a numerical control program, wherein the computerized numerical controller interprets the numerical control program and calculates a desired position and a desired velocity of the controlled system.

12. A method of controlling a servomotor to move a movable member to a desired position, comprising:

providing a control input from a sliding mode controller to the servomotor, wherein the control input includes a linear control input and a nonlinear control input;

determining an estimated state of a controlled system which includes the servomotor and the movable member;

providing the estimated state to the sliding mode controller;

generating an estimated disturbance and providing the estimated disturbance to the sliding mode controller; and equating the nonlinear control input to the negative of the estimated disturbance, wherein disturbance "d" is defined from an equation of motion for the controlled system as follows:

$d = Kt \cdot Iq - J\ddot{\theta}$ where Kt is a torque constant, Iq is a q-axis current, J is an inertia moment, θ is an angular position, and $\ddot{\theta}$ is the corresponding angular acceleration.

13. The method of claim 12 wherein the control input is a controlled current for the servomotor.

14. The method of claim 12 wherein the estimated state is based on an estimated position and an estimated velocity.

15. The method of claim 14 wherein the estimated state is further based on an integral value of an error between a target position and a measured position.

16. The method of claim 12 further comprising a state observer generating an estimated velocity.

17. The method of claim 16 further comprising a disturbance observer receiving the control input and the estimated velocity.

18. The method of claim 12 further comprising providing a target position to the sliding mode controller.

19. The motion controller of claim 18 further comprising calculating a desired position and a desired velocity of the controlled system.

* * * * *

UNITED STATES PATENT AND TRADEMARK OFFICE
CERTIFICATE OF CORRECTION

PATENT NO. : 7,019,482 B2
APPLICATION NO. : 10/446874
DATED : March 28, 2006
INVENTOR(S) : Koji Yoneda It is certified that error appears in the above-identified patent and that said Letters Patent is hereby corrected as shown below:

IN THE SPECIFICATION:

Column 3, line 53, "," should be inserted after "$\theta$";

Column 4, line 43, "k>|S•Fs•$d_{max}$|" should read -- k>|S•Fs•$d_{max}$|--;

Column 5, line 4, in the third line of Equation 13, the first occurrence of "$d$" should read -- $\hat{d}$ --;

Column 5, line 23, Equation 14, "$\hat{z} = [v \; \hat{x} \; \hat{x}]$" should read -- $\hat{z} = [v \; \hat{x} \; \dot{\hat{x}}]$ --; and Column 5, line 26, "$\hat{x}$" should read -- $\dot{\hat{x}}$ --.

Signed and Sealed this

Twenty-first Day of November, 2006

JON W. DUDAS
*Director of the United States Patent and Trademark Office*